P. H. KELLS.
Mower.
No. { 119, 1.223. }
Reissued Aug 13, 1861.
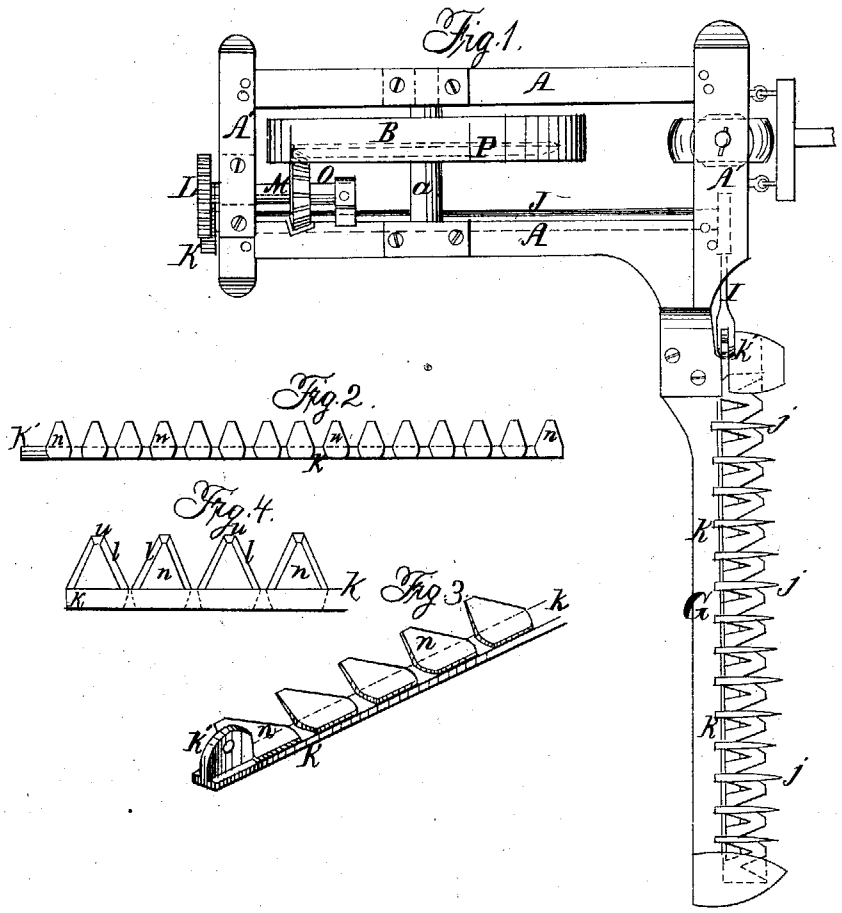
Witness { J. M. Forte A. Lee
Randolph Coyle Jr
Thos H. Dodge
Assee of
Philip H. Kells
N. PETERS, PHOTO-LITHOGRAPHER, WASHINGTON, D. C.

UNITED STATES PATENT OFFICE.

P. H. KELLS, OF ADRIAN, MICHIGAN, ASSIGNOR TO THOMAS H. DODGE, OF WASHINGTON, DISTRICT OF COLUMBIA.

IMPROVEMENT IN HARVESTERS.

Specification forming part of Letters Patent No. 10,671, dated March 21, 1854; Reissue No. 1,223, dated August 13, 1861.

*To all whom it may concern:*

Be it known that PHILIP H. KELLS, formerly of Hudson, in the county of Columbia and State of New York, but now residing in Adrian, in the county of Lenawee and State of Michigan, invented certain new and useful Improvements in Harvesters or Mowing-Machines, of which the following is a full, clear, and exact description, reference being had to the annexed drawings, forming part of this specification, and in which—

Figure 1 is a plan view of a KELLS' mowing-machine with closed guards and a cutter constructed on Green's principle attached to cutter-bar *k;* Fig. 2, a plan or top view of the cutter-bar with KELLS' improved cutter attached thereto; Fig. 3, a perspective view of part of said cutter-bar and cutters; and Fig. 4, a bottom view of four cutters attached to their bar, showing the position of their bevel as respects the cutter and cutter-bar.

To prevent the clogging up of the cutting apparatus in a mowing-machine has engaged a great deal of attention on the part of manufacturers of such machines, especially in those classes of machines in which a closed finger or guard is used. To obviate the difficulty said KELLS devised the plan of constructing the cutter with its rear corners cut off at an angle, as shown in the drawings, and also of fastening them to the cutter-bar so as to leave an open space between them, as represented in the drawings, each cutter being made separately.

G is the finger-beam, to the front of which the slotted fingers or guards *j* may be fastened in any proper manner. In this instance the lower rear part of the guard enters a hole in the front edge of the finger-beam. *k* is the cutter-bar, to the top of which the cutters *n n* are fastened. The cutter-bar and cutters are vibrated, as the machine is drawn forward, through proper openings in the guards by means of pitman I, eccentric or crank shaft J, gears K L, shaft M, and bevel-gears O P, the latter being fastened to the main wheel B, fast on journal *a*, (which turns in bearings in the main frame A A A′ A′,) and indicated in dotted lines. That part of the cutter *n* which is in front of the cutter-bar *k* has the lower edges of its sides or angles beveled off, as seen at *l l*, and, if preferred, the point can be beveled off, as seen at *u*. By this mode of making the cutter and fastening it to its bar the cut is made by the upper edges of the cutter working in combination with the upper lip of the guard. Consequently the stalks are not liable to catch upon or against the front upper edge of the finger-beam, as might be the case if the bevel were on the upper side and the cut made by the lower edges. By cutting off the rear corners of the cutters at an angle the cutter is not materially weakened, while the rear of the cutters is made to perform the function of angular scrapers or clearers, the rear angles tending to draw or work out any fine grass, cut stalks, or gummy matter which may happen to get in under the top lip of the guard. By having the rear corners cut off at an angle the matter or clogging substance is not only worked out laterally, but is worked back at the same time, whereby it is not so liable to be carried back into the guard again by the return-stroke. Again, in a mowing-machine, unless the clearing-surface extend as far forward as the front of the cutter-bar, or to a point where the action of the beveled cutting-edge comes into play, there is danger of the cutter and bar being clogged by an accumulation between the point where the rear cutting is done and the point where the front of the clearing commences. To obviate this KELLS devised one mode—viz., placing the cutters a short distance apart on their bar. By this mode, too, no additional part is added to the cutter, but the metal of the cutter itself is made to answer the purpose of clearing-surfaces.

As the various other parts of the machine have been described in other patented divisions of even date herewith, it is not deemed necessary to repeat the description here.

One practical mode of applying the improvements to use having been described, I hereby disclaim the invention described in the patent granted to J. H. Manny June 21, 1853, that described in the patent of Henry Green issued March 21, 1854, and also in that issued to T. D. Burrell April 5, 1853.

What is claimed under this patent as the invention of said PHILIP H. KELLS is—

1. Forming or constructing the cutters in mowing-machines separately in the form shown in Figs. 2, 3, and 4 of the accompanying drawings, for the purposes specified.

2. The use and employment, in a mowing-machine, of a series of slotted fingers, in combination with a series of cutters fastened rigidly to their bar in such a manner as to leave an open space between the cutters to facilitate the clearing of the fingers as the cutters and cutter-bar reciprocate through the slotted fingers.

In testimony whereof I hereunto subscribe my name.

THOMAS H. DODGE,
*Assignee of Philip H. Kells.*

In presence of—
WM. YORKE ATLEE,
RANDOLPH COYLE, JR.